US006213526B1

(12) United States Patent
Swanger et al.

(10) Patent No.: US 6,213,526 B1
(45) Date of Patent: Apr. 10, 2001

(54) BUMPER INTEGRATED SCHOOL BUS SAFETY ARM

(75) Inventors: Eric D. Swanger, Huntersville, NC (US); Brad A. Hively; Andrew J. Zielinski, both of Fort Wayne, IN (US); Frank H. Stanhope, Arlington Heights, IL (US)

(73) Assignee: Navistar International Transportation Corp., Chicago, IL (US)

( * ) Notice: Subject to any disclaimer, the term of this patent is extended or adjusted under 35 U.S.C. 154(b) by 0 days.

(21) Appl. No.: 09/430,584

(22) Filed: Oct. 29, 1999

Related U.S. Application Data
(60) Provisional application No. 60/158,479, filed on Oct. 8, 1999.

(51) Int. Cl.[7] .................................................. B60R 19/48
(52) U.S. Cl. .......................... 293/117; 293/24; 116/28 R; 116/35 R; 116/51
(58) Field of Search ................... 293/117, 24; 116/28 R, 116/35 R, 51, 52

(56) References Cited

U.S. PATENT DOCUMENTS

| | | | |
|---|---|---|---|
| 3,153,398 | * 10/1964 | Verne Runkle et al. | 116/28 R |
| 4,559,518 | * 12/1985 | Latta | 116/28 R |
| 4,697,541 | * 10/1987 | Wicker | 293/117 |
| 4,766,413 | * 8/1988 | Reavell | 116/28 R |
| 4,956,630 | * 9/1990 | Wicker | 116/28 R |
| 4,983,949 | * 1/1991 | Wicker | 116/28 R |
| 5,036,307 | * 7/1991 | Reavell et al. | 340/487 |
| 5,132,662 | * 7/1992 | Burch | 340/433 |
| 5,199,754 | * 4/1993 | Freeman | 293/117 |
| 5,293,151 | * 3/1994 | Rose | 116/28 R |
| 5,406,250 | * 4/1995 | Reavell et al. | 116/28 R |
| 5,564,359 | * 10/1996 | Harder | 116/28 R |
| 5,620,219 | * 4/1997 | Servant | 293/117 |
| 5,812,052 | * 9/1998 | Swanger et al. | 340/433 |
| 5,860,385 | * 1/1999 | Lamparter | 116/28 R |

* cited by examiner

*Primary Examiner*—Joseph D. Pape
*Assistant Examiner*—Kiran B. Patel
(74) *Attorney, Agent, or Firm*—Jeffrey P. Calfa; Dennis Kelly Sullivan; Gilberto Hernandez

(57) ABSTRACT

A school bus crossing or a mounting system that more fully integrates the crossing arm and the bumper. To achieve this, the primary mounting brackets for the crossing arm drive system may be mounted to the bus chassis and an opening is formed in the bumper itself. The crossing arm is mounted to the drive system such that the arm projects through the opening in the bumper. Alternatively, the primary mounting brackets may be mounted to an inner surface of the bumper. A recess may be formed into an outer surface of the bumper such that the crossing arm is at least partially tucked into the recess when retracted. In one embodiment, there is no recess in the bumper. The crossing arm is contoured to follow the outer surface of the bumper.

22 Claims, 4 Drawing Sheets

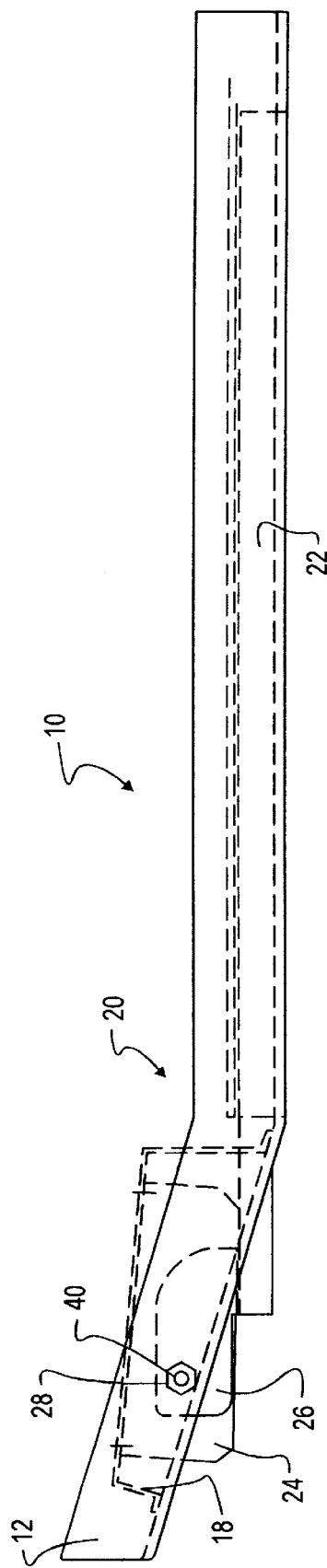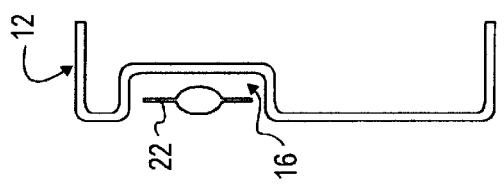

BUMPER INTEGRATED SCHOOL BUS SAFETY ARM

This is a non-provisional application claiming priority under provisional patent application Ser. No. 60/158,479, filed Oct. 8, 1999.

BACKGROUND OF THE INVENTION

The present invention relates broadly to school bus safety equipment and, more particularly, to crossing arms that are mounted on the front portion of a school bus to prevent children from walking beneath the line of sight of the driver. Bus mobile vehicles are for transporting people.

School bus safety crossing arms are known, generally, to include a light weight, frame-like arm member which is pivotally mounted to one front corner of the school bus nearest the door. A control system acts to operate a drive motor to cause the arm to move pivotally from a position parallel with the bus bumper to a position parallel with the side of the bus and projecting forwardly from the front bumper. The school bus provides controls for the driver's selective operation.

In operation, the driver extends the crossing arms when discharging or taking on passengers. As stated above, these arms prevent children from walking so closely to the bus so as to be out of the line of sight of the driver which, in the past, has resulted in injuries.

In order for the crossing arm to be effective, the arm must be mounted so that, in its extended position, it is parallel to both the ground and the side of the bus. This mounting allows the arm to pivot through a horizontal plane, thus reducing wear on the bearings and other drive components. As bus front facias become more streamlined, mounting becomes difficult because the bumpers are becoming more integrated with the front-end components of the bus body. Fuel conservation concerns are leading to more streamlined buses and, consequently, mounting of the crossing arms becomes more difficult when the preferred geometry is to be maintained. Currently, brackets are used which are often bolted to the front, top and sides of a bus bumper. These brackets are used regardless of the actuation method associated with the unit, which could include air, vacuum or electric control. As a result, the crossing arm unit, in its retracted position, is located 4 to 5 inches in front of the bumper itself.

Consequently, there exist a need for a safety crossing arm which more fully integrates with the front end of a school bus.

SUMMARY OF THE INVENTION

It is accordingly an object of the present invention to provide a school bus crossing or a mounting system that more fully integrates the crossing arm and the bumper.

To achieve this, the primary mounting brackets for the crossing arm drive system may be mounted to the bus chassis and an opening is formed in the bumper itself. The arm is mounted to the drive system such that the arm projects through the opening in the bumper. Alternatively, the primary mounting brackets may be mounted to an inner surface of the bumper.

A recess may be formed longitudinally with respect to the bumper and is configured for receiving at least a portion of the crossing arm therein. Therefore, the arm can be mounted to the school bus with a modem, streamlined bumper in a more integral fashion. With the arm in its retracted position, the arm itself resides in the recess formed in the bumper while the drive unit and mounting bracket remain at least partially recessed within the opening formed in the bumper. Where there is no recess, the crossing arm is formed to conform to the outer surface of the bumper and in the retracted position the arm is at or immediately adjacent to the outer surface of the bumper. The arm may then be extended in a conventional manner.

The present invention provides several advantages. Initially, the crossing arm is less likely to sustain damage. According to the prior art, by mounting the crossing arm at a position which results in the arm projecting 4 to 5 inches in front of the bumper, any collision will likely destroy the arm and its drive system. Further, it is known that some buses are parked in a front to back relationship wherein the spacing between the buses is judged by bumping the rear bumper of the parked bus ahead. While possibly not destroying the conventional crossing arm, damage would likely result. The present invention offers a measure of protection for the arm and its drive assembly by the bumper itself. Therefore, the present invention enhances reliability of this crossing arm. Further, the life of the crossing arm may be extended due to lessened exposure to the weather since the bumper actually covers the drive system. Additionally, the drive system is protected from road and wheel splash.

In addition, the present invention acts to reduce damage by removing a convenient step for drivers and mechanics seeking access to the engine compartment of the bus.

With the crossing arm fitted into the bumper recess, the possibility of the arm being forced downwardly by air passing there across when the bus is in motion is reduced. This featured results in less likelihood of damage to the crossing arm. The crossing arm also reduces the risk of injury to pedestrians due to the removal of exposure to sharp corners often found on mounting brackets.

From a manufacturing standpoint, the integral crossing arm significantly reduces labor. Since the bumper is designed to fit the crossing arm itself, the crossing arm could be bolted on. The many steps of drilling holes, placing brackets and adjusting brackets would be eliminated.

Finally, safety is enhanced because the crossing arm is positioned correctly and is allowed to move through the preferred horizontal plane.

BRIEF DESCRIPTION OF THE DRAWINGS

FIG. 2 is a top plan view of the bumper integrated school bus safety arm illustrated in FIG. 1.

FIG. 3 is a left side view of the safety crossing arm illustrated in FIGS. 1 and 2.

DESCRIPTION OF THE PREFERRED EMBODIMENT

Figure 1:
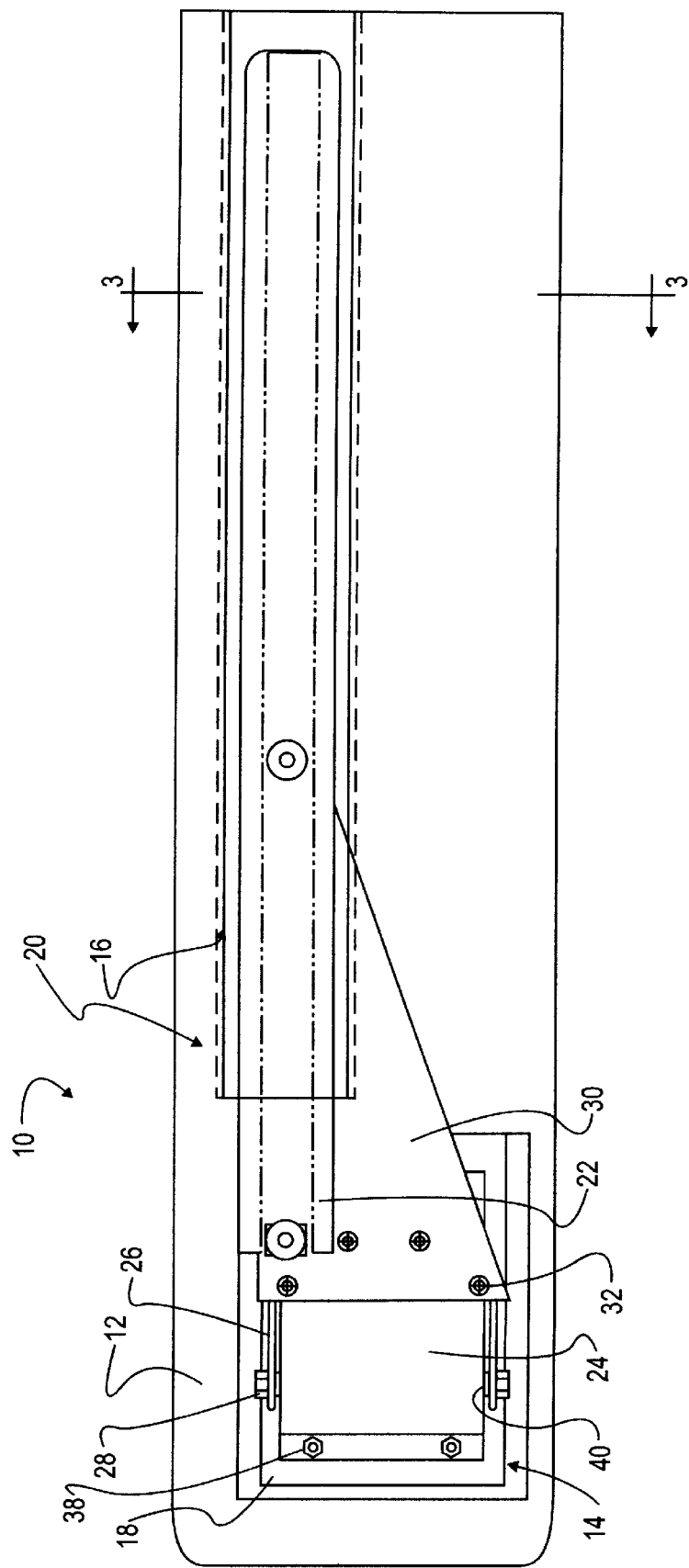
FIG. 1 is a front elevation view of a bumper integrated school bus safety arm according to the preferred embodiment of the present invention.
Figure 4:
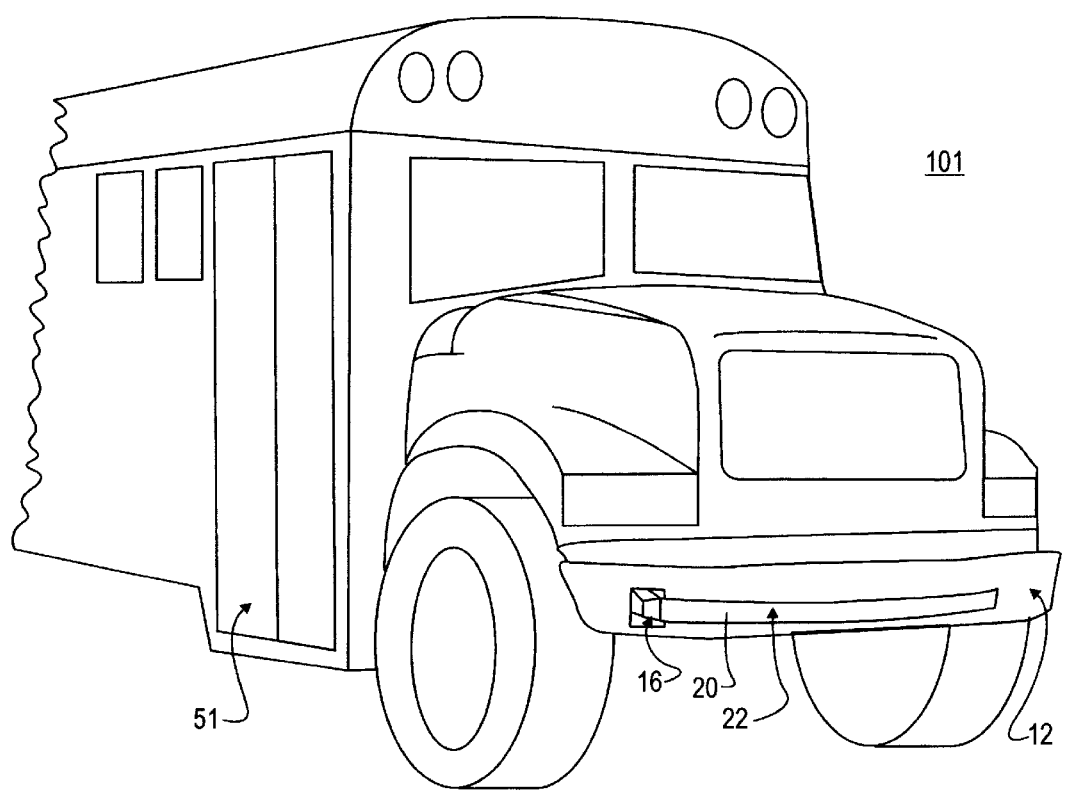
FIG. 4 is a mobile school bus vehicle with a bumper integrated school bus safety arm according to the preferred embodiment of the present invention installed and in a retracted position.
Figure 5:
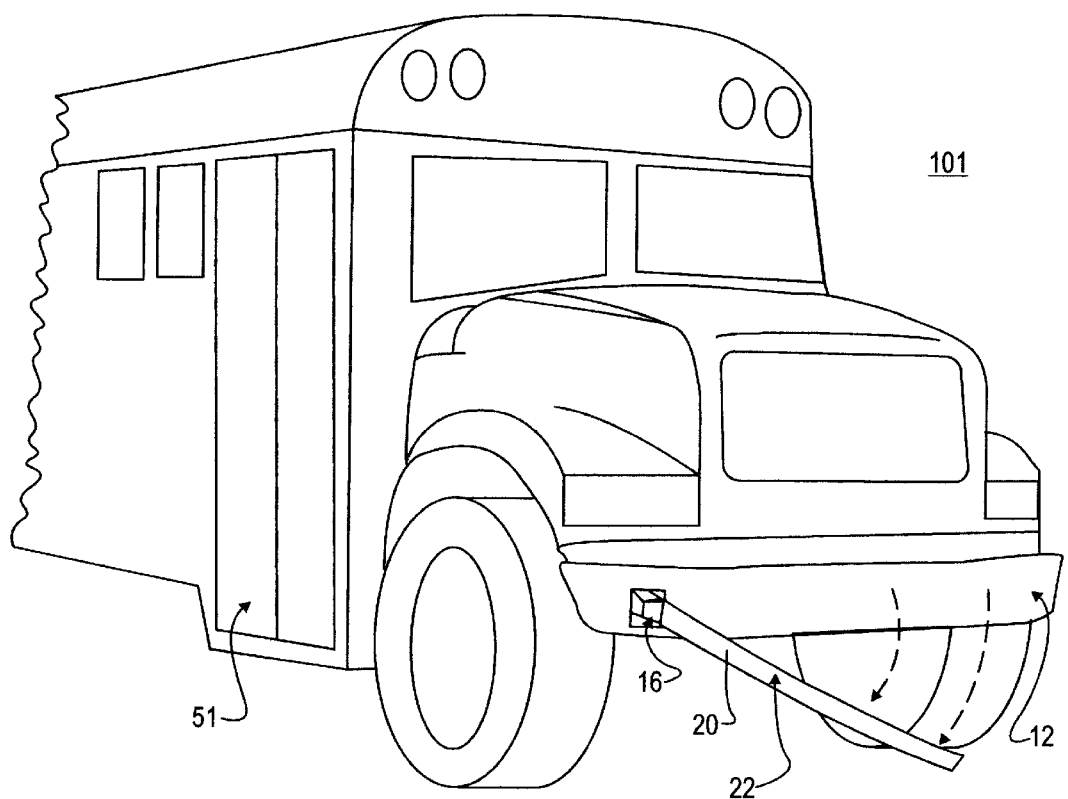
FIG. 5 is the vehicle of FIG. 4 with the crossing in an extended position.

Turning now to the drawings and, or particularly to FIG. 1, a chassis mounted safety crossing arm and integrated bumper are illustrated generally at 10 and includes a crossing arm assembly 20 mounted to a drive unit 24 which is in turn mounted to the bus chassis depicted generally at 18. The bus chassis as part of a mobile vehicle 101 is shown in FIGS. 4 and 5 with an embodiment of the crossing arm assembly 20 installed. The chassis 18 is a conventional bus chassis. With a bus body residing on the chassis, a bumper 12 is formed as a generally elongate member extending laterally across the face of the bus in front of the chassis 18. It should be noted that the bumper 12 may include a rubber cover and may be styled differently than the bumper depicted herein. Nevertheless, the principles associated with the present invention are applicable to all buses with integrated bumpers. The bumper 12 is preferably formed with a generally rectangular opening 14 on one side thereof. Alternatively, the opening 14 in the bumper 12 may of any suitable shape or size. The opening 14 is formed on the same side of the bus 101 as the door 51. This allows the safety crossing arm to block access to the front of the bus for school children. The bumper 12 may be formed with a recess extending laterally across the face of the bumper and indented a predetermined amount, as seen in FIGS. 1 and 3. The recess 16 may be sized and configured to accommodate various styles of safety crossing arms. The bumper 12 may also be formed without the recess 16.

The arm drive unit 24 is known in the trade and preferably mounts to the chassis 18 using bolts 38. Alternatively, the arm drive unit 24 may be mounted to a rear portion of the bumper 12. The present invention is applicable to all drive units of conventional size. As seen in FIG. 2, the drive unit 24 is in registry with the opening 14 formed in the bumper 12.

The safety crossing arm 22 may be mounted to the drive unit 24 using a triangular mounting plate 30 which is attached using bolts 32 to a pair of arm-like bracket members 26 which are in turn rotatably mounted to the drive unit 24 using bolts 28. The brackets 26, the plate 30 and the crossing arm 22 are all in generally linear alignment with the arm 22 projecting outwardly through the opening 14 formed in the bumper 12. This relationship is perhaps best seen in FIG. 2. Since the recess 16 is formed in conformance to the shape of the crossing arm 22; the arm 22, when retracted, resides within the recess 16 in a manner that is not flush. This relationship is best seen in FIG. 3. The crossing arm 22 may be rest completely or partially within the recess 16. Where the bumper 12 has no recess, the crossing arm inner surface conforms to an outer surface of the bumper 12. This differs from prior art because the mounting of the drive unit 24 to the chassis 18 or to a rear surface of the bumper 12 allows the crossing arm 22 to rest at or immediately adjacent to the outer surface of the bumper 22 in the retracted position.

In operation, the bus driver excites the drive unit 24 into motion using a conventional control system, whereupon the brackets 26, which are attached to the drive unit 24 are caused to pivot through 90 degrees. This action brings the crossing arm 22 through a 90 degrees sweep into a generally parallel relationship with the side of bus. Upon release by the school bus driver, the drive unit 24 causes the arm to pivot back through the original 90 degrees to be received in the recess at 16 formed in the bumper. Where there is no recess, the arm 22 is received at or immediately adjacent to the outer surface of the bumper 22.

As has been more fully explained above, the present invention provides several advantages over the state of the art and school bus crossing arms, all of which result in an increased life span for the arm, a more streamlined appearance, and enhanced ease of manufacturer.

Those persons skilled in the art will therefore readily understand that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

We claim:

1. An integrated bumper crossing arm assembly for a mobile vehicle with a chassis, comprising:
   a bumper for engagement to a component of the chassis;
   an arm drive unit for engagement directly to the chassis;
   a crossing arm rotatably mounted to the drive unit; and
   an opening through said bumper allowing pivotal rotation of said crossing arm by said drive unit, said drive unit located behind a forward portion of said bumper.

2. The integrated bumper crossing arm assembly of claim 1, wherein said bumper has a recess formed in conformance to the shape of said crossing arm.

3. The integrated bumper crossing arm assembly of claim 1, wherein:
   said crossing arm has an extended position and a retracted position;
   said crossing arm is parallel to a ground surface when installed and in said extended position; and
   said crossing arm is parallel to a side of the vehicle when installed and in said extended position.

4. The integrated bumper crossing arm assembly of claim 2, wherein:
   said crossing arm has an extended position and a retracted position;
   said crossing arm is parallel to a ground surface when installed and in said extended position;
   said crossing arm is parallel to a side of the vehicle when installed and in said extended position; and
   said crossing arm is partially within said recess when installed and in said retracted position.

5. The integrated bumper crossing arm assembly of claim 2, wherein:
   said crossing arm has an extended position and a retracted position;
   said crossing arm is parallel to a ground surface when installed and in said extended position;
   said crossing arm is parallel to a side of the vehicle when installed and in said extended position; and
   said crossing arm is completely within said recess when installed and in said retracted position.

6. An integrated bumper crossing arm assembly for a mobile vehicle with a chassis, comprising:
   a bumper for engagement to a component of the chassis;
   an arm drive unit for engagement to an inner surface of said bumper,
   a crossing arm rotatably mounted to the drive unit; and
   an opening through said bumper allowing pivotal rotation of said crossing arm by said drive unit, said drive unit located behind a forward portion of said bumper.

7. The integrated bumper crossing arm assembly of claim 6, wherein said bumper has a recess formed in conformance to the shape of said crossing arm.

8. The integrated bumper crossing arm assembly of claim 6, wherein:

said crossing arm has an extended position and a retracted position;

said crossing arm is parallel to a ground surface when installed and in said extended position; and said crossing arm is parallel to a side of the vehicle when installed and in said extended position.

9. The integrated bumper crossing arm assembly of claim 7, wherein:

said crossing arm has an extended position and a retracted position;

said crossing arm is parallel to a ground surface when installed and in said extended position;

said crossing arm is parallel to a side of the vehicle when installed and in said extended position; and said crossing arm is partially within said recess when installed and in said retracted position.

10. The integrated bumper crossing arm assembly of claim 7, wherein:

said crossing arm has an extended position and a retracted position;

said crossing arm is parallel to a ground surface when installed and in said extended position;

said crossing arm is parallel to a side of the vehicle when installed and in said extended position; and said crossing arm is completely within said recess when installed and in said retracted position.

11. An integrated bumper crossing arm for assembly on a mobile vehicle with a front bumper engaged to a chassis with structural members, the bumper having a through opening, and the bumper having a front surface, comprising:

an arm drive unit for engagement to structural members of the chassis;

a crossing arm rotatably mounted to the drive unit;

said crossing arm and said drive unit engageable for operation through the front bumper opening, said drive unit located behind a forward portion of said bumper; and said crossing arm formed in conformance to the shape of a front surface in the bumper.

12. The integrated bumper crossing arm of claim 11, wherein said crossing arm is conformed to a recess in the front surface of the bumper.

13. A mobile vehicle for transporting people, comprising:

a chassis;

a bumper engaged to a component of said chassis;

an arm drive unit for engagement to said chassis;

a crossing arm rotatably mounted to the drive unit; and an opening through said bumper allowing pivotal rotation of said crossing arm by said drive unit, said drive unit located behind a forward portion of said bumper.

14. The vehicle of claim 13, wherein said bumper has a recess formed in conformance to the shape of said crossing arm.

15. The vehicle of claim 13, wherein:

said crossing arm has an extended position and a retracted position;

said crossing arm is parallel to a ground surface and in said extended position; and said crossing arm is parallel to a side of the vehicle and in said extended position.

16. The vehicle of claim 14, wherein:

said crossing arm has an extended position and a retracted position;

said crossing arm is parallel to a ground surface and in said extended position;

said crossing arm is parallel to a side of the vehicle and in said extended position; and said crossing arm is partially within said recess and in said retracted position.

17. The vehicle of claim 14, wherein:

said crossing arm has an extended position and a retracted position;

said crossing arm is parallel to a ground surface and in said extended position;

said crossing arm is parallel to a side of the vehicle and in said extended position; and said crossing arm is completely within said recess and in said retracted position.

18. A mobile vehicle for transporting people, comprising:

a chassis;

a bumper engaged to a component of said chassis;

an arm drive unit for engagement to an inner surface of said bumper, behind a forward portion of said bumper;

a crossing arm rotatably mounted to said drive unit; and an opening through said bumper allowing pivotal rotation of said crossing arm by said drive unit.

19. The vehicle of claim 18, wherein said bumper has a recess formed in conformance to the shape of said crossing arm.

20. The vehicle of claim 18, wherein:

said crossing arm has an extended position and a retracted position;

said crossing arm is parallel to a ground surface and in said extended position; and said crossing arm is parallel to a side of the vehicle and in said extended position.

21. The vehicle of claim 19, wherein:

said crossing arm has an extended position and a retracted position;

said crossing arm is parallel to a ground surface and in said extended position;

said crossing arm is parallel to a side of the vehicle and in said extended position; and said crossing arm is partially within said recess and in said retracted position.

22. The vehicle of claim 19, wherein:

said crossing arm has an extended position and a retracted position;

said crossing arm is parallel to a ground surface and in said extended position;

said crossing arm is parallel to a side of the vehicle and in said extended position; and said crossing arm is completely within said recess and in said retracted position.

* * * * *